US006865732B1

(12) United States Patent
Morgan

(10) Patent No.: US 6,865,732 B1
(45) Date of Patent: Mar. 8, 2005

(54) PROVIDING AN EMBEDDED APPLICATION SPECIFIC WEB SERVER

(75) Inventor: Jeffrey A. Morgan, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/430,877

(22) Filed: Nov. 1, 1999

(51) Int. Cl.$^7$ ............................................. G06F 9/45
(52) U.S. Cl. ..................... 717/140; 717/165; 719/315; 718/1; 709/203
(58) Field of Search ............................... 719/310–320; 709/200–203; 718/1; 717/140–169

(56) References Cited

U.S. PATENT DOCUMENTS

| | | | | |
|---|---|---|---|---|
| 5,761,512 A | * | 6/1998 | Breslau et al. | 717/140 |
| 5,797,015 A | * | 8/1998 | Daniels et al. | 709/331 |
| 5,860,004 A | * | 1/1999 | Fowlow et al. | 717/109 |
| 5,867,712 A | * | 2/1999 | Shaw et al. | 717/127 |
| 5,987,247 A | * | 11/1999 | Lau | 717/100 |
| 6,052,710 A | * | 4/2000 | Saliba et al. | 709/203 |
| 6,075,935 A | * | 6/2000 | Ussery et al. | 716/17 |
| 6,154,843 A | * | 11/2000 | Hart et al. | 713/200 |
| 6,189,103 B1 | * | 2/2001 | Nevarez et al. | 713/201 |
| 6,199,196 B1 | * | 3/2001 | Madany et al. | 717/165 |
| 6,446,192 B1 | * | 9/2002 | Narasimhan et al. | 709/203 |

* cited by examiner

*Primary Examiner*—St. John Courtenay, III

(57) ABSTRACT

A method of providing an embedded web server for a device is described. The device is of a particular device platform and is required to run a web application. The method includes the step of providing a web server class library and a virtual machine class library. The web server class library and the virtual machine class library include classes suitable for different web applications. The method also includes the step of identifying a particular web application to be run on the device. The libraries and the web application are then passed through a compiler to select from the web server class library and the virtual machine class library classes required to run the web application in the device to form the web server. This makes the web server an application-specific web server which requires minimized storage space from the device when embedded in the device. A system for providing an application-specific embedded web server for a device is also described.

15 Claims, 5 Drawing Sheets

PROVIDING AN EMBEDDED APPLICATION SPECIFIC WEB SERVER

BACKGROUND OF THE INVENTION

1. Field of the Invention

The present invention pertains to embedded web access functionality. More particularly, this invention relates to providing an embedded web server that is based on or configured specifically for web applications run on a device with limited computing and storage resources such that the web server is application-specific and is small enough to be embedded and run on the device.

2. Description of the Related Art

An Internet network system typically includes an Internet Service Provider (ISP) system and an interconnect network that connects the ISP system with remote user terminals and other ISP systems. An ISP system typically includes a web server that utilizes Internet applications, such as electronic mail, bulletin boards, news groups, and World Wide Web access, to provide data accesses and services to users via their user terminals. Each of the user terminals includes a web browser that allows the user to access the contents hosted in the web servers of the ISP systems.

The rapid growth of the Internet, widespread use of the World Wide Web, and a trend toward deployment of broadband residential networks have led to the development of embedding the web server into electrical and electronic devices such as home appliances (e.g., washing machine), peripheral devices (e.g., scanner and printer) of a computer system, and measurement instruments (e.g., blood pressure analyzer). This means that a web server can be either implemented in one or several physically separate computer systems, or embedded within an electrical or electronic device.

The embedded web server can be implemented in software form. It is therefore desirable to develop a generic web server that can be embedded in various devices. However, problems typically arise when developing such a generic web server. One problem is that different computer systems and/or electronic devices have their processing resources conformed to different hardware architectures (referred to as hardware platforms for software execution). Each architecture is usually defined by a particular instruction set, hardware register set, and memory arrangement, etc. Software written or compiled to be executed on a particular hardware platform (i.e., native code) usually does not run on other non-compatible hardware platforms. This means that a web server for a particular hardware platform is typically only suitable for devices of that platform.

One prior solution to this problem is to provide a virtual machine for the generic web server. The virtual machine enables the generic web server to execute on a variety of differing hardware device platform. As is known, the software programs executing under such a virtual machine usually take the form of a stream of instructions, each of which conforms to a predefined instruction set supported by the virtual machine. The virtual machine then either interprets each of the instructions in the stream and provides emulation of the instructions in the native code of the particular hardware platform, or generates native code version of the software programs of the particular hardware platform.

FIG. 1 shows that prior solution. As can be seen from FIG. 1, the device 10 includes a device platform 11, a virtual machine 12, an embedded web server 13, and web application programs 14. The device platform 11 includes hardware 11b and native codes 11a. The native codes 11a typically include device hardware-specific system programs (e.g., device operating systems) that (1) manage the resources of the device 10 and (2) execute other application programs in native code. The virtual machine 12 runs on top of the native codes 11a. The web server 13 is a generic web server. The web applications 14 are functional extensions of the web server 13. The virtual machine 12 enables the embedded generic web server 13 and the web applications 14 to execute on a variety of differing hardware/device platforms.

However, disadvantages are still associated with the prior solution shown in FIG. 1. One disadvantage is that the virtual machine typically significantly increases the size of the embedded web server since the embedded web server structure now needs to include both the web server and the virtual machine. In addition, the size of the virtual machine is also relatively large. This is due to the fact that the virtual machine needs to be applicable to a large variety of web applications. To achieve this, the virtual machine needs to contain codes for different web applications, even though these web applications may not be running in the device. Unfortunately, this one-size-fits-all virtual machine typically causes the web server structure to consume large amounts of resources such as memory and processor cycles and are therefore not well suited for devices having relatively limited resources.

Thus, there is a need to develop a web server structure that requires minimized storage space when embedded in a device.

SUMMARY OF THE INVENTION

One feature of the present invention is to embed a web server in a device with limited computing and storage resources.

Another feature of the present invention is to configure an embedded web server such that it only requires minimized storage space when embedded in a device.

A further feature of the present invention is to provide an embedded web server based on the web applications run on the device.

A still further feature of the present invention is to provide a compiler that configures an embedded web server based on the web applications run on the device.

A method of providing an embedded web server for a device is described. The device is required to run a web application. The method includes the step of providing a web server class library and a virtual machine class library. The web server class library and the virtual machine class library include classes suitable for different web applications. The method also includes the step of identifying a particular web application to be run on the device. The libraries and the web application are then passed through a compiler to select from the web server class library and the virtual machine class library classes required to run the web application in the device to form the web server. This makes the web server an application-specific web server which requires minimized storage space from the device when embedded in the device.

A system for providing a web server for a device is also described. The device is required to run a web application. The system includes a web server class library and a virtual machine class library. Each of the class libraries includes classes for different web applications. The system also includes a compiler that receives the libraries and the web application to select from the web server class library and the virtual machine class library classes required to run the web application in the device to form the web server such that the web server is an application-specific web server and requires minimized storage space when embedded in the device.

A web server structure for a device having a device platform is also described. The web server structure includes a web application that performs a predetermined web function. The web server structure also includes an application-specific web server core and an application-specific virtual machine that together execute the web application on the device. The application-specific web server core and virtual machine are specifically configured for the web application such that they require minimized storage space when embedded in the device.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
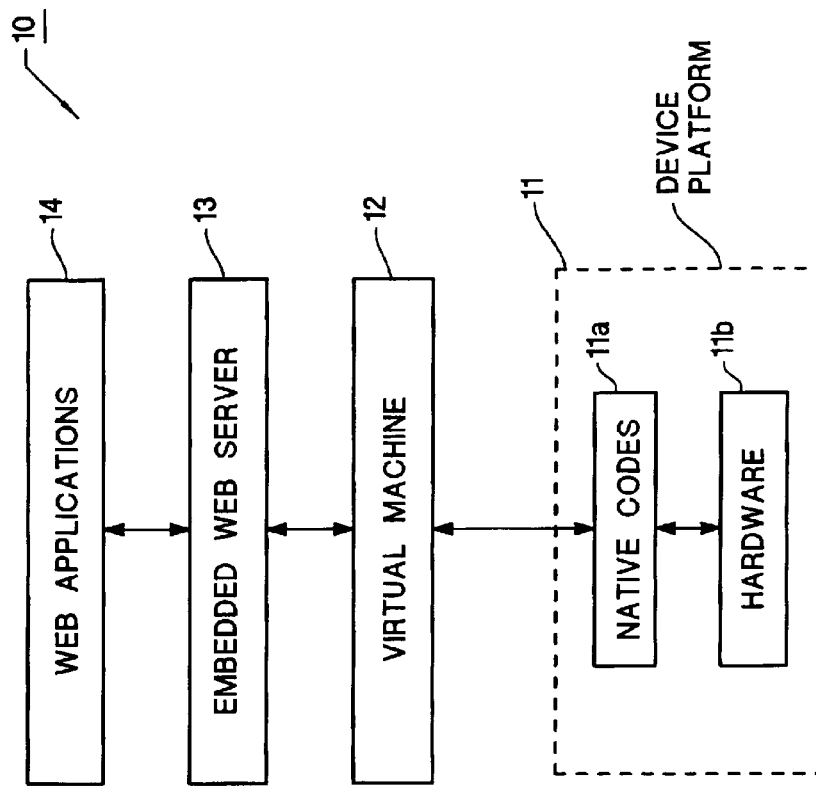
FIG. 1 shows a prior art arrangement of an embedded web server structure for a device.
Figure 2:
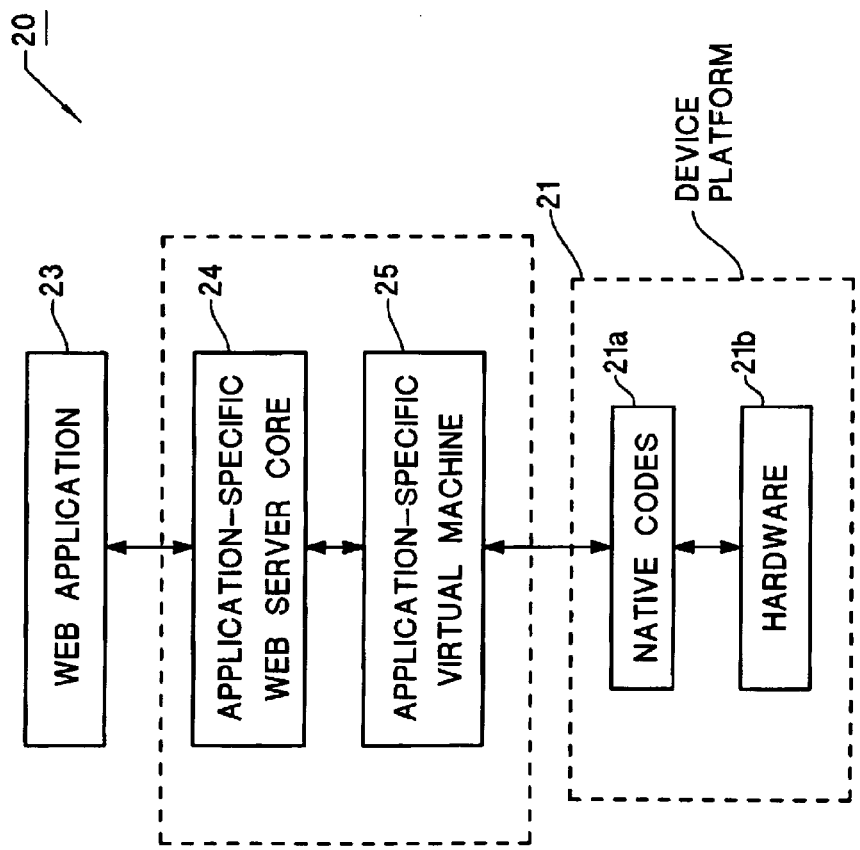
FIG. 2 shows an application-specific embedded web server structure for a device in accordance with one embodiment of the present invention.

FIG. 2 shows a device 20 with a web server structure 22 that implements one embodiment of the present invention. The web server structure 22 enables a web application 23 to execute on a device platform 21 of the device 20. The web server structure 22 is embedded in the device 20. This can be accomplished, for example, by storing the web server structure 22 in a memory or storage of hardware 21b of the device 20 when the web server structure 22 is implemented in software form.

In accordance with one embodiment of the present invention, the web server structure 22 is specifically configured or tuned to execute the web application 23 on the device platform 21 of the device 20 such that the web server structure 22 is an application-specific web server structure which requires minimized storage space when embedded in the device 20. This allows the web server structure 22 to be embedded in a device with limited storage resources.

As will be described in more detail below, the application-specific web server structure 22 enables (i.e., provides a runtime environment for) the web application 23 to be executed on the device platform 21 of the device 20. The web application 23 performs one or more predetermined web functions. The application-specific web server structure 22 includes an application-specific web server core 24 and an application-specific virtual machine 25. The application-specific web server core 24 and the application-specific virtual machine 25 are specifically configured or tuned for running the web application 23 such that they require minimized storage space when embedded in the device 20. In addition, the application-specific web server core 24 and the application-specific virtual machine 25 are specifically tuned (in terms of the class files required) to run the web application 23.

Figure 3:
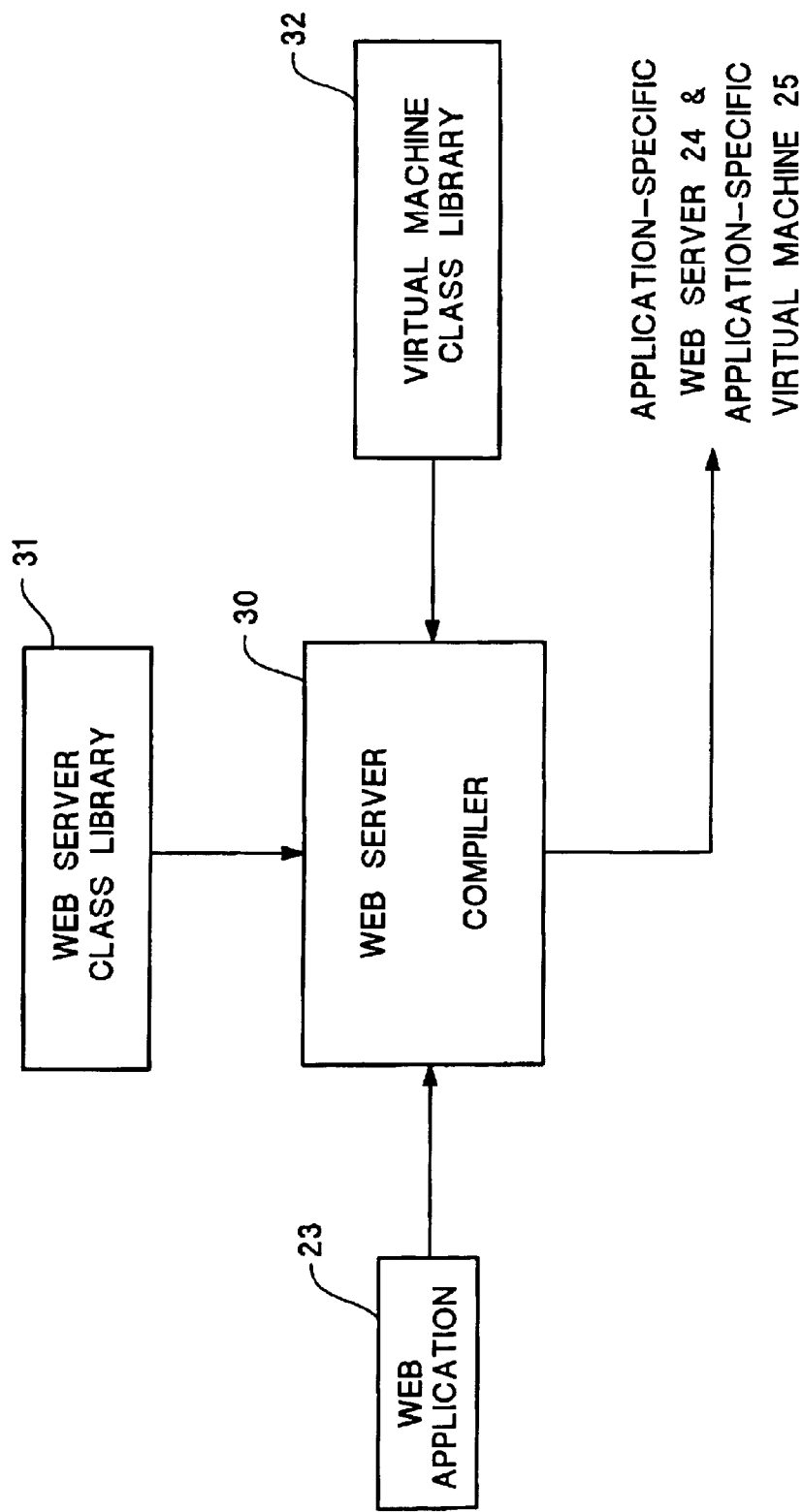
FIG. 3 shows the compiler that generates the application-specific embedded web server structure in accordance with one embodiment of the present invention.

The application-specific web server core 24 and the application-specific virtual machine 25 are both configured by a web server compiler 30 (FIG. 3). The web server compiler 30 generates the application-specific web server core 24 from a web server class library 31 (shown in FIG. 3). The web server class library 31 includes all web server class files needed to run various web applications, including the web application 23. The web server compiler 30 also generates the application-specific virtual machine 25 from a virtual machine class library 32 (shown in FIG. 3). The virtual machine class library 32 includes virtual machine class files that are required to enable a variety of web server classes and web applications to execute on the device platform 21 of the device 20. This allows the web server structure 22 to only require minimized storage space when being embedded in the device 20. In addition, this also allows the application-specific web server structure 22 to be specifically tuned (in terms of the class files required) to run the web application 23. The application-specific web server structure 22 and the web server compiler 30 will be described in more detail below, also in conjunction with FIGS. 2–5.

Referring to FIG. 2, the device 20 can be any kind of electrical or electronic device such as a computer peripheral device (e.g., a printer, a fax machine, a copier, a scanner), a communication device, a television, a video player, an audio player, a home appliance (e.g., refrigerator or dish washer), a medical device (e.g., a blood pressure analyzer or a patient monitoring device). In addition, the device 20 can be a computer-based device such as a personal computer, a notebook computer, a palm-top computer, a mini-computer, or any other computer systems.

As described above, the device 20 includes the device platform 21. The device platform 21 of the device 20 includes the hardware 21b and native codes 21a. The hardware 21b includes processing and memory/storage resources. The processing and memory resources of the hardware 21b conform to a particular known architecture, which is defined by instruction set, hardware register set, and memory arrangement, etc. The particular architecture can also be referred to as a hardware platform for software execution. The construction of the hardware 21b depends on the type of the device 20 and the functions the device 20 provides.

The native codes 21a are executed on the hardware 21b. The native codes 21a are written or compiled to be executed on the particular hardware platform of the hardware 21b. The native codes 21a typically include hardware-specific system programs (e.g., device operating systems) that (1) manage the resources of the hardware 21b of the device 20 and (2) execute other application programs in native code. The native codes 21a can be implemented using any known means. The construction of the native codes 21a, however, depends on the particular hardware platform of the hardware 21b. The native codes 21a and hardware 21b together form the device platform 21 of the device 20.

As can be seen from FIG. 2, the device 20 also includes the application-specific web server structure 22. The web server structure 22 is configured on top of the device platform 21. The web server structure 22 allows the device 20 to be universally accessible by web clients (not shown) connected to the device 20 via communication networks (not shown). The networks are capable of carrying Internet/Intranet communications. A web client can be a web browser in a computer system. It can also another web server embedded in another device. The web client accesses the web server structure 22 of the device 20 using an open standard communication protocol (e.g., HTTP). The HTTP protocol is used to transfer multiple information encodings between network elements.

The web server structure 22 exchanges messages with the web clients using the HTTP protocol. The web server structure 22 receives HTTP commands or requests from the web clients. The HTTP commands specify one of a set of predetermined URLs for the device 20. The web server structure 22 is accessed by a unique URL for the device 20. When the device 20 supports multiple resources, the web server structure 22 includes resource URLs to allow accesses to those resources. Thus, the URLs for the device 20 specify the web pages and application and control programs associated with the web server structure 22.

The HTTP commands or requests are used by the web clients to obtain information from the device 20, or to invoke some control or application programs in the device to perform some functions. In addition, HTTP commands are generated in the device 20 to perform file transfers, and to obtain new information and software codes for loading into the device 20 and for updating software codes.

The web server structure 22 also enables the web application 23 to run on the device platform 21. The web server structure 22 is an application-specific web server structure based on the web application 23. This means that the web server structure 22 is specifically configured for the web application 23. In other words, the web server structure 22 provides a runtime environment specifically tuned to run the web application 23. This allows the web server structure 22 to be small in size and requires minimized space to store.

The web application 23 is run on top of the web server structure 22. The web application 23 is a functional extension of the web server structure 22. The web application 23 performs one or more predetermined web-related functions. The web application 23 can be any known web application. Alternatively, the web application 23 includes a number of known web applications. When this is the case, the application-specific web server structure 22 is specifically configured to all of the web applications.

In one embodiment, the web server structure 22 is implemented by software. Alternatively, the web server structure 22 can be implemented in other forms. For example, the web server structure 22 can be implemented by firmware.

The web server structure 22 and the web application 23 are embedded in the device 20. This means that when the web server structure 22 is implemented by software, the web server structure 22 and the web application 23 are stored in the storage of the hardware 21b of the device 20. The web server structure 22 and the web application 23 can also be embedded in the device 20 by other means (e.g., firmware).

The web server structure 22 includes the application-specific web server core 24 and the application-specific virtual machine 25. The web server core 24 provides the basic web server functions to the device 20. In addition, the web server core 24 allows the web application 23 to provide additional web functions to the device 20. The web server core 24 is an application-specific web server core that is based on the web application 23. This means that the web server core 24 is specifically configured to provide a runtime environment specifically tuned to run the web application 23.

The web server core 24 runs on the application-specific virtual machine 25 which in turn runs on the native codes 21a. The virtual machine 25 provides logical abstraction of the underlying physical system (i.e., device platform 21) of the device 20 to the web server core 24. This means that the virtual machine 25 provides an execution environment for the web server core 24 and the web application 23. The main function of the virtual machine 25 is to enable the web server core 24 and the web application 23 to execute on the device platform 21 of the device 20. Here, the low level interpreter of the virtual machine 25 and the native codes 21a necessary to access the system hardware have already been written for the particular hardware platform of the hardware 21b of the device 20. This means that the virtual machine 25 is also a device-specific virtual machine.

The virtual machine 25 is also an application-specific virtual machine that is based on the web application 23. This means that the virtual machine 25 is specifically configured to provide a runtime environment specifically tuned to run the web application 23 and the application-specific web server core 24 that is also based on the web application 23.

As described above, the web server core 24 is an application-specific web server core that is based on the web application 23. In addition, the virtual machine 25 is also an application-specific virtual machine that is based on the web application 23. This causes the web server structure 22 which includes the web server core 24 and the virtual machine 25 to be minimal in size and requires minimized storage resources when embedded in the device 20. This in turn causes the device 20 to be of a device with limited resources. This also means that both the web server core 24 and the virtual machine 25 are specifically tuned to provide a runtime environment for running the web application 23 in terms of class files required.

Figure 4:
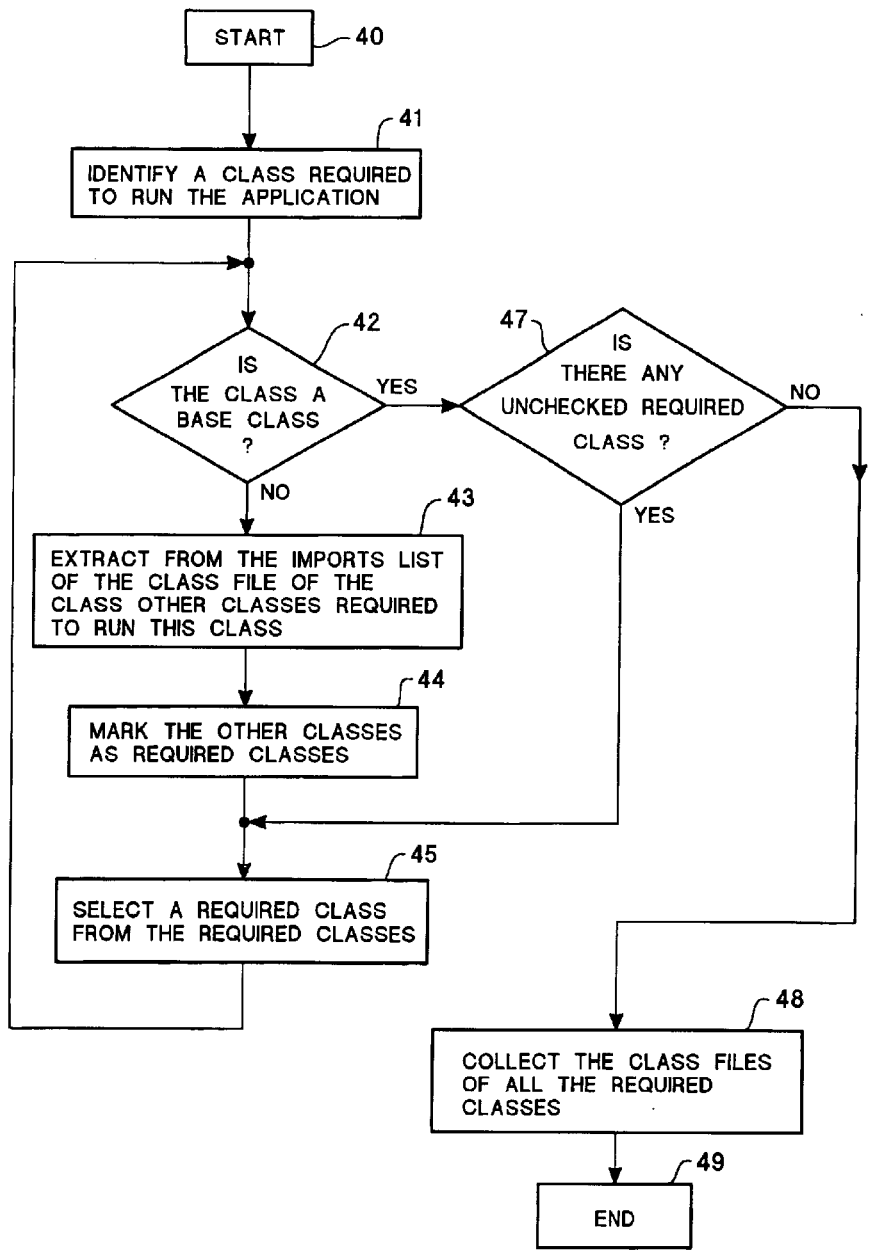
FIG. 4 shows in flow chart diagram form the process of the compiler of FIG. 3 in generating the application-specific embedded web server structure of FIG. 2.
Figure 5:
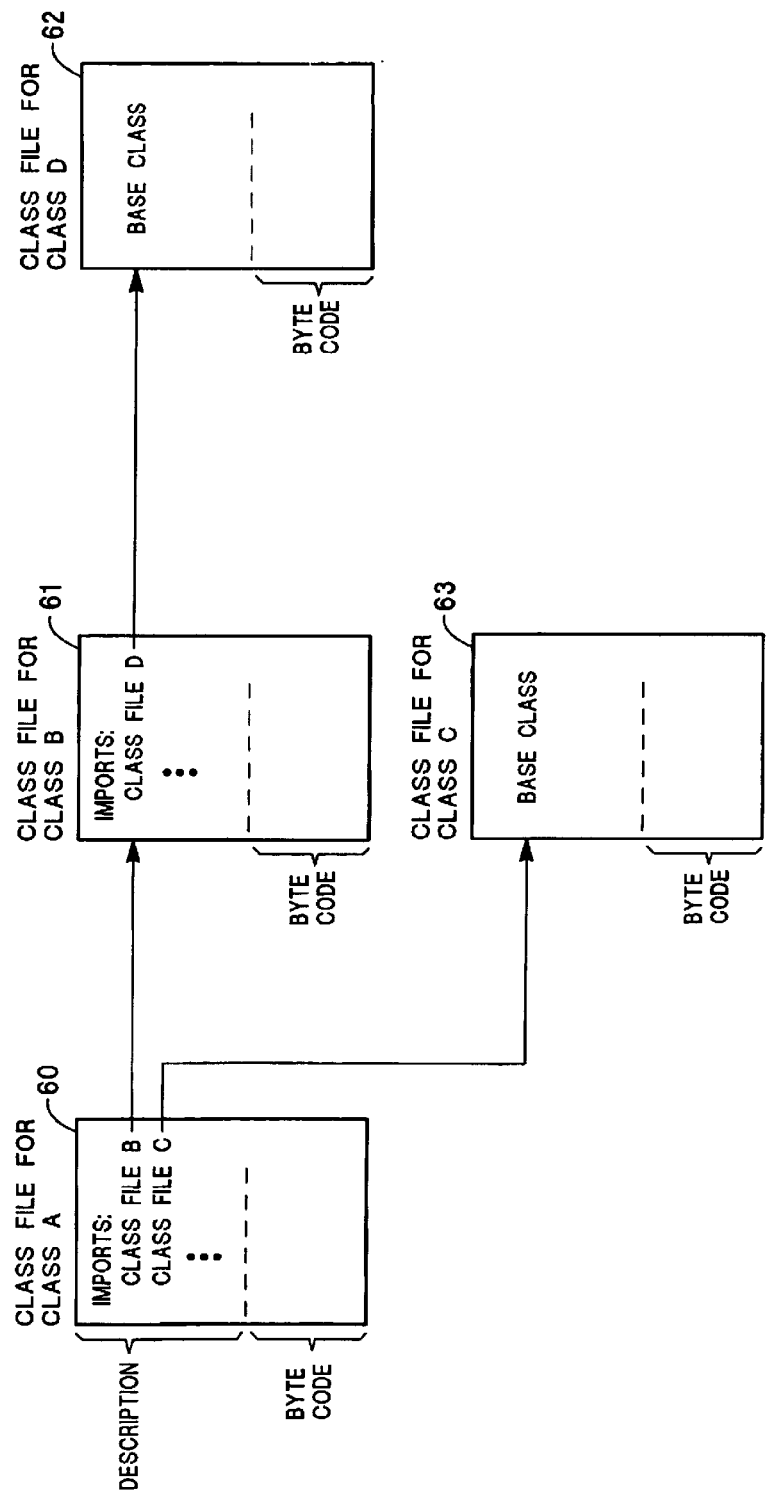
FIG. 5 illustrates the operation of the compiler of FIG. 3 in generating the application-specific embedded web server structure of FIG. 2.

Both of the application-specific web server core 24 and the application-specific virtual machine 25 are generated by a web server compiler 30 (shown in FIG. 3). The web server compiler 30 generates the application-specific web server core 24 from a web server class library 31 and the application-specific virtual machine 25 from a virtual machine class library 32 (both shown in FIG. 3). FIG. 3 shows the process of configuring the two modules (i.e., 24 and 25) using the web server compiler 30, which will be described in more detail below. FIG. 4 shows the process of the web server compiler 30 in parsing (1) the web server class library 31 to configure the application-specific web server core 24 based on the web application 23, or (2) the virtual machine class library 32 to configure the application-specific virtual machine 25 based on the web application 23. FIG. 4 will also be described in more detail below.

Referring to FIG. 3, the web server compiler 30 receives the web application 23, the web server class library 31, and the virtual machine class library 32 to configure the application-specific web server core 24 and the application-specific virtual machine 25 based on the web application 23. As described above, the web server core 24 is configured from the web server class library 31 and the virtual machine 25 is configured from the virtual machine class library 32. The web server class library 31 includes all the web server class files that are required to run all the known web applications. This means that the library 31 is a complete collection of web server class files required to run any known web application. The virtual machine class library 32 includes all the virtual machine class files that are required to run all the known web applications and web server class files. This means that the library 32 is a complete collection of virtual machine class files required to run any known web application and web server. Here, the low level interpreter of the virtual machine class library 32 necessary to access the system hardware and native codes has already been written for the particular device platform 21 of the device 20. This means that the virtual machine class library 32 is also a device-specific virtual machine class library.

The class files in each of the libraries 31–32 define objects that implement the web server or virtual machine. The file definition for each class file in each of the libraries 31–32 is standard and interpreted. In addition, class dependancies between class files in each of the class libraries 31–32 can easily be determined by parsing the class file definition of a class file. Given the above, it is now possible for the compiler 30 to automatically parse the class files of each of the libraries 31–32 to create the application-specific web server core 24 and the application-specific virtual machine 25 that are specifically tuned (in terms of classes required) to run the web application 23. FIG. 4 shows the parsing operation of the compiler 30, which will be described in more detail below.

FIG. 4 shows in flow chart diagram form the process of parsing (1) the web server class library 31 to configure the application-specific web server core 24 based on the web application 23, or (2) the virtual machine class library 32 to configure the application-specific virtual machine 25 based on the web application 23 by the web server compiler in accordance with one embodiment of the present invention. As can be seen from FIG. 24, the process starts at the step 40. At the step 41, a class required to run the web application 23 is identified from a class library (i.e., either library 31 or 32). Then the next step 42 is performed to determine if the required class is a base class. This can be done by looking at the imports field of the class file of the required class (see the class file 62 or 63 in FIG. 5). If the imports field of the class file does not point to other classes, then the required class is a base class. This means that executing the required class does not require other classes. If the imports field of the class file of the required class points to other classes, then the required class is not a base class (i.e., execution of the required class requires the execution of these other classes).

If the required class is determined not to be a base class at the step 42, then the step 43 is performed at which the compiler 30 extracts from the imports list of the class file of the required class (e.g., the import list of the class file 60 in FIG. 5) the other classes (e.g., the classes B and C in FIG. 5) that are listed as required to run the required class. The compiler 30 then marks the other classes as required classes at the step 44. The compiler 30 then selects another required class from the other required classes at the step 45. The process then moves back to the step 42.

If, at the step 42, it is determined that the required class is a base class, then the step 47 is performed, at which it is determined whether there are other unchecked required classes. If so, the process moves to the step 45. If not, the process moves to the step 48 at which the class files of all the required classes are collected to form the, application-specific web server 24 or virtual machine 25. The process then ends on the step 49.

The following shows a specific example of the web server structure 22 in FIG. 2 configured by the web server compiler 30 of FIG. 3 in accordance with one embodiment of the present invention. In this example, the particular web application 23 is the known Web-link application. The Web-link application is a Java web-based application used to support mobile web sites. The Web-link application is constructed as a set of Java Classes and requires 48.8 KBytes space to store.

In this case, the application-specific web server core 24 is an application-specific SmallWeb web server which is derived from a known SmallWeb web server class library (available from Hewlett-Packard Company of Palo Alto, Calif.). The SmallWeb class library has a size of 230 KBytes. The application-specific virtual machine 25 is an application-specific Java virtual machine which is also derived from a known Java virtual machine (for Win32) class library (also available from Hewlett-Packard Company of Palo Alto, Calif.). The Java virtual machine class library includes a Java interpreter and a Java class library. The Java virtual machine class library requires 8.98 MBytes storage space. The total size for the entire system (including the Web-link application) will be more than 9 Mbytes, which is obviously far too large to fit in any device with limited storage resources. In addition, this size is also far too large to fit on a 1.44 MBytes floppy disk.

After passing the Java virtual machine class library, the SmallWeb class library, and the Web-link application through the web server compiler 30 (FIG. 3) of the present invention, the application-specific SmallWeb web server and the application-specific Java virtual machine are generated. The SmallWeb web server which is specifically configured for the Web-link application only has a size of 178 KBytes. Likewise, the Java virtual machine which is specifically configured for the Web-link application only requires a storage space of 914 KBytes. In this case, the total size of the entire system (including the Web-link application) is only a bit over 1 MBytes, which can easily be stored on a 1.44 MBytes floppy disk with space to spare.

From the above example, it is clear that the size of virtual machine can be significantly tuned based on its usage of the underlying web applications.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method of providing an embedded web server for a device, comprising:

(A) providing a web server class library and a virtual machine class library, wherein the web server class library and the virtual machine class library include class files for different web applications and for forming different application-specific web servers that execute on the device;

(B) identifying a particular web application to be run on the device; and (C) compiling the web server by selecting, from the web server class library and the virtual machine class library, class files required to run the web application on the device to form the web server, wherein the web server is specific to the web application and wherein the web server exchanges messages with other devices in communication with the device via a network.

2. The method of claim 1, wherein the step (C) further comprises receiving at a compiler the web server and virtual machine libraries and the web application, the compiler parsing the web server and virtual machine libraries to select the class files that correspond to the web application.

3. The method of claim 1, wherein for each of the web server and virtual machine libraries, the step (C) is performed by
   (I) identifying from a library a class required to run the web application;
   (II) extracting from a class file of the required class other classes required to run the required class;
   (III) repeating the steps (I) and (II) for each of the required classes until the required class is a base class;
   (IV) collecting all the required classes to form the web server.

4. The method of claim 1, wherein the device is an electronic device and the web server is embedded in the device.

5. The method of claim 1, wherein the device runs a plurality of web applications, including the particular web application, wherein the step (C) compiles the web server by selecting from the web server class library and the virtual machine class library, class files required to run all of the web applications in the device to form the web server.

6. The method of claim 1, wherein the web server comprises a web server core specific to the web application and a virtual machine specific to the web application, the web server core compiled from class files in the web server class library and the virtual machine compiled from class files in the virtual machine class library.

7. The method of claim 6, wherein the class files in the virtual machine class library comprise class files for the class files in the web server class library.

8. A system for providing a web server for a device running a web application, comprising:
   a web server class library that includes web server class files for different web applications for forming different application-specific web server cores;
   a virtual machine class library that includes virtual machine class files for the different web applications and for the web server class files for forming different application-specific virtual machines; and
   a compiler that accesses the web server class library and the virtual machine class library, identifies the web application, selects from the web server class library and the virtual machine class library the web server class files and the virtual machine class files required to run the web application on the device, forms an application-specific web server core that is specific to the web application, and forms an application-specific virtual machine that is specific to the web application, wherein the application-specific web server core and the application-specific virtual machine in combination constitute an application-specific web server that enables the web application to execute on the device.

9. The system of claim 8, wherein the device is an electronic device and the application-specific web server is embedded in the device.

10. The system of claim 8, wherein the compiler selects the class files from each of the web server and virtual machine libraries by
    (I) identifying from a library a class required to run the web application;
    (II) extracting from a class file of the required class other classes required to run the required class;
    (III) repeating the steps (I) and (II) for each of the required classes until the required class is a base class;
    (IV) collecting all the required classes to form the application-specific web server.

11. The system of claim 8, wherein the device runs a plurality of web applications, including the particular web application, wherein the compiler compiles a web server for running all of the plurality of web applications by selecting from the web server and virtual machine libraries, class file required to run all web applications in the plurality of web applications.

12. The system of claim 8, wherein the application-specific web server exchanges messages with other devices in communication with the device via a network.

13. A web server structure for a device, comprising:
    a web application that performs a predetermined web function; and
    an application-specific web server core and an application-specific virtual machine that together constitute an application-specific web server that enables the web application to execute on the device, wherein the application-specific web server core and the application-specific virtual machine are compiled from a web server class library and a virtual machine class library respectively, wherein the web server class library includes web server class files for different web applications and for forming different application-specific web server cores, and wherein the virtual machine class library includes virtual machine class files for the different web applications and for the web server class files for forming different application-specific virtual machines, wherein the application-specific web server allows the device to be accessed by other devices in communication with the device via a network.

14. The web server structure of claim 13, wherein the device is an electronic device and the application-specific web server structure is embedded in the device.

15. The web server structure of claim 13, further comprising a plurality of web applications, including the particular web application, wherein the application-specific web server core and virtual machine are specifically configured to run the applications such that they require minimized storage space when embedded in the device.

* * * * *